(12) United States Patent
Stronati et al.

(10) Patent No.: US 10,920,707 B2
(45) Date of Patent: Feb. 16, 2021

(54) FUEL HEATING

(71) Applicant: McLaren Automotive Limited, Surrey (GB)

(72) Inventors: Luca Stronati, Surrey (GB); Davide Bizzari, Woking (GB); Davide Montosi, Woking (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 16/312,156

(22) PCT Filed: Jun. 26, 2017

(86) PCT No.: PCT/GB2017/051864
§ 371 (c)(1),
(2) Date: Dec. 20, 2018

(87) PCT Pub. No.: WO2017/221036
PCT Pub. Date: Dec. 28, 2017

(65) Prior Publication Data
US 2019/0195162 A1    Jun. 27, 2019

(30) Foreign Application Priority Data

Jun. 24, 2016 (GB) .................................. 16110553

(51) Int. Cl.
*F02D 41/30* (2006.01)
*F02D 41/04* (2006.01)
(Continued)

(52) U.S. Cl.
CPC ....... *F02D 41/3005* (2013.01); *F01N 3/0296* (2013.01); *F01N 3/225* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,845,760 | B2 | 1/2005 | Linna et al. |
| 6,913,005 | B2 | 7/2005 | Linna et al. |

(Continued)

FOREIGN PATENT DOCUMENTS

| | | | |
|---|---|---|---|
| CN | 1761812 A | 4/2006 | |
| CN | 1798919 A | 7/2006 | |

(Continued)

OTHER PUBLICATIONS

International Searching Authority, International Search Report and Written Opinion for International Application No. PCT/GB2017/051864, dated Oct. 12, 2017, 16 pages, European Patent Office, Netherlands.

(Continued)

*Primary Examiner* — Binh Q Tran
(74) *Attorney, Agent, or Firm* — Alston & Bird LLP

(57) ABSTRACT

A vehicle comprising: an internal combustion engine configured to generate an engine torque using high-gasoline content fuel; at least one fuel injector configured to deliver the high-gasoline content fuel to a cylinder of the engine; at least one heating element configured to heat the high-gasoline content fuel prior to it being delivered to the cylinder by the fuel injector; a fuel pump connected to the heating element to supply high-gasoline to the heating element, the fuel pump being configured to pressurise the high-gasoline content fuel; and an engine controller configured to control the engine torque generated by the engine and control the fuel pressure generated by the fuel pump, the engine controller using a heated-fuel behaviour model of the engine, when the fuel is being heated by the heating element(s), to: (i) control an amount of fuel delivered by the (Continued)

fuel injector, the heated-fuel behaviour model causing a reduced fuel injection amount for a given engine torque relative to unheated high-gasoline content fuel; and (ii) cause a higher fuel pressure to be generated by the fuel pump relative to unheated high-gasoline content fuel.

22 Claims, 2 Drawing Sheets

(51) Int. Cl.
| | |
|---|---|
| *F02M 53/02* | (2006.01) |
| *F02M 53/06* | (2006.01) |
| *F02M 31/125* | (2006.01) |
| *F01N 3/22* | (2006.01) |
| *F02M 31/18* | (2006.01) |
| *F02M 37/04* | (2006.01) |
| *F01N 3/029* | (2006.01) |
| *F01N 11/00* | (2006.01) |

(52) U.S. Cl.
CPC .......... *F01N 11/005* (2013.01); *F02D 41/047* (2013.01); *F02M 31/125* (2013.01); *F02M 31/183* (2013.01); *F02M 53/02* (2013.01); *F02M 53/06* (2013.01); *F01N 2240/16* (2013.01); *F01N 2900/0412* (2013.01); *F01N 2900/08* (2013.01); *F02D 2200/021* (2013.01); *F02D 2200/0606* (2013.01); *F02D 2250/18* (2013.01); *F02D 2250/31* (2013.01); *F02M 37/04* (2013.01); *Y02T 10/12* (2013.01)

(56) References Cited

U.S. PATENT DOCUMENTS

| | | | |
|---|---|---|---|
| 7,669,585 | B2 | 3/2010 | Haag et al. |
| 8,793,983 | B2* | 8/2014 | Ganesan ............... B01F 5/0463 |
| | | | 60/286 |
| 8,984,868 | B2* | 3/2015 | Patel ..................... B01F 5/0463 |
| | | | 60/277 |
| 9,399,971 | B2 | 7/2016 | Kawamura |
| 2004/0000296 | A1 | 1/2004 | Linna et al. |
| 2005/0066939 | A1* | 3/2005 | Shimada ............. F02D 41/0007 |
| | | | 123/431 |
| 2013/0118458 | A1* | 5/2013 | Kojima ................. F02D 19/022 |
| | | | 123/552 |
| 2015/0090230 | A1* | 4/2015 | Bolz ................... F02D 41/0085 |
| | | | 123/480 |
| 2015/0122217 | A1* | 5/2015 | Bullmer ................. F02M 53/02 |
| | | | 123/295 |
| 2015/0167600 | A1* | 6/2015 | Kawamura ........... F02D 41/123 |
| | | | 123/445 |

FOREIGN PATENT DOCUMENTS

| | | |
|---|---|---|
| CN | 101006267 A | 7/2007 |
| CN | 104204477 A | 12/2014 |
| DE | 10045753 A1 | 3/2002 |
| DE | 102008056892 A1 | 5/2010 |
| WO | WO 2004/065769 A2 | 8/2004 |
| WO | WO 2012/001310 A1 | 1/2012 |
| WO | WO 2015/069265 A1 | 5/2015 |

OTHER PUBLICATIONS

Chinese Office Action for Application No. 201780045677.9, dated Aug. 13, 2020, (27 pages), China National Intellectual Property Administration.

* cited by examiner

FUEL HEATING

CROSS REFERENCE TO RELATED APPLICATIONS

This application is a National Stage Application, filed under 35 U.S.C. § 371, of International Application No. PCT/GB2017/051864, filed Jun. 26, 2017, which claims priority to United Kingdom Application No. 1611055.3, filed Jun. 24, 2016; the contents of both of which are hereby incorporated by reference in their entirety.

BACKGROUND

Related Field

This invention relates to a vehicle that has reduced fuel injection volumes due to heating of high-gasoline content fuel.

Description of Related Art

A typical road vehicle comprises an internal combustion engine that uses sparks to ignite fuel inside of piston chambers to generate an engine torque. It is becoming increasing desirable for the internal combustion engine to run with reduced emissions of carbon dioxide and pollutants, such as nitrogen-oxides (NOxs), carbon monoxide (CO), total hydrocarbons (THC) and non-methane hydrocarbons (NMHC). This is due, in part, to governmental legislation that is requiring a reduction in vehicles emissions of these products.

One method of reducing emissions is to reduce the amount of fuel burned by the internal combustion engine, for example by making the internal volume of the piston chambers smaller so that less fuel is capable of being burnt during each combustion cycle of the engine. However, such a reduction in fuel burned by the internal combustion engine can have the effect of meaning that the internal combustion engine produces less power. Whilst this may be acceptable in certain applications of vehicles, in others, such as high-performance vehicles or vehicles that need to move heavy loads, a reduction in the power generated by the vehicle in return for lower emissions is unacceptable.

It would therefore be desirable for there to be a more efficient way of burning fuel whilst maintaining the power output of the engine.

BRIEF SUMMARY

According to a first aspect of the present invention there is provided A vehicle comprising: an internal combustion engine configured to generate an engine torque using high-gasoline content fuel; at least one fuel injector configured to deliver the high-gasoline content fuel to a cylinder of the engine; at least one heating element configured to heat the high-gasoline content fuel prior to it being delivered to the cylinder by the fuel injector; a fuel pump connected to the heating element to supply high-gasoline content fuel to the heating element, the fuel pump being configured to pressurise the high-gasoline content fuel; and an engine controller configured to control the engine torque generated by the engine and control the fuel pressure generated by the fuel pump, the engine controller using a heated-fuel behaviour model of the engine, when the fuel is being heated by the heating element(s), to: (i) control an amount of fuel delivered by the fuel injector, the heated-fuel behaviour model causing a reduced fuel injection amount for a given engine torque relative to unheated high-gasoline content fuel; and (ii) cause a higher fuel pressure to be generated by the fuel pump relative to unheated high-gasoline content fuel.

The heated-fuel behaviour model may cause a reduction in the carbon-dioxide emissions of the internal combustion engine relative to unheated high-gasoline content fuel. The heated-fuel behaviour model may cause a reduction in the pollutant emissions of the internal combustion engine relative to unheated high-gasoline content fuel.

The engine controller may use an unheated-fuel behaviour model of the engine when the fuel is not being heated by the heating element(s) and the heated-fuel behaviour model may cause a reduced fuel injection amount for a given engine torque relative to the unheated-fuel behaviour model of the engine. The internal combustion engine may comprise at least one intake port for the cylinder and an intake valve for controlling the flow of an air-mixture in to the cylinder, wherein the at least one fuel injector may be configured to inject the high-gasoline content fuel in a region near the intake valve exterior to the cylinder. The vehicle may comprise an engine temperature sensor, and wherein the engine controller may be configured to cause the high-gasoline content fuel to be heated by the at least one heating element whilst the engine temperature is below a predefined threshold temperature. The predefined threshold temperature may be a normal engine operating temperature. The predefined threshold temperature may be below a normal engine operating temperature.

The heated-fuel behaviour model may adjust the fuel injection amount for a given engine torque based on the vapour content value of the heated fuel. The internal combustion engine may be configured to generate the engine torque for driving the vehicle. The engine controller may be configured to cause the at least one heating element to heat the high-gasoline content fuel. The engine controller may be configured to control the engine torque generated by the engine in response to a target drive demand input.

The engine controller may use an unheated-fuel behaviour model of the engine when the fuel is not being heated by the heating element(s) and the heated-fuel behaviour model may cause the engine controller to cause a higher fuel pressure to be generated by the fuel pump relative to the unheated-fuel behaviour model of the engine. The internal combustion engine may be configured to generate a spark inside the cylinder to ignite the high-gasoline fuel; and the engine controller may be configured to control the generation of the spark, the engine controller may use a heated-fuel behaviour model of the engine, when the fuel is being heated by the heating element(s), to control the generation of the spark inside the cylinder so that the spark occurs later in an engine cycle for the cylinder relative to unheated high-gasoline content fuel. The engine controller may use an unheated-fuel behaviour model of the engine when the fuel is not being heated by the heating element(s) and the heated-fuel behaviour model causes the engine controller to cause the spark generation to occur later in an engine cycle for the cylinder relative to the unheated-fuel behaviour model of the engine.

The vehicle may comprise an exhaust connected to the internal combustion engine to receive exhaust gases from the engine; and a secondary air injection device for injecting air into the exhaust; wherein the engine controller may be configured to control the amount of air injected by the secondary air injection device into the exhaust, the engine controller using a heated-fuel behaviour model of the engine, when the fuel is being heated by the heating element(s), to cause a lower amount of air injection by the secondary air injection device relative to unheated high-gasoline content fuel. The engine controller may use an unheated-fuel behaviour model of the engine when the fuel is not being heated by the heating element(s) and the heated-fuel behaviour model may cause the engine controller to cause the lower amount of air injection by the secondary air injection device relative to the unheated-fuel behaviour model of the engine.

The internal combustion engine may comprise at least one inlet port for a respective cylinder of the engine, and an inlet valve associated with each inlet port, the inlet valve being moveable between a first position where the valve seals the inlet port and a second position where the valve permits fluid flow through the inlet port to the respective cylinder; wherein the fuel injector(s) may deliver fuel to a region near respective inlet valve(s), and the engine controller may be configured to control when the fuel injector injects fuel, the engine controller using the heated-fuel behaviour model of the engine, when the fuel is being heated by the heating element(s), to cause the fuel injection for an engine cycle to start closer to when the inlet valve moves from the first position to the second position relative to unheated high-gasoline content fuel. The engine controller may use an unheated-fuel behaviour model of the engine when the fuel is not being heated by the heating element(s) and the heated-fuel behaviour model may cause the engine controller to cause the fuel injection for an engine cycle to start closer to when the inlet valve moves from the first position to the second position relative to the unheated-fuel behaviour model of the engine. The injector(s) may deliver fuel on to respective inlet valves.

According to a second aspect of the present invention there is provided vehicle comprising: an internal combustion engine configured to generate an engine torque using high-gasoline content fuel; at least one fuel injector configured to deliver the high-gasoline content fuel to a cylinder of the engine; at least one heating element configured to heat the high-gasoline content fuel prior to it being delivered to the cylinder by the fuel injector; a fuel pump connected to the heating element to supply high-gasoline content fuel to the heating element, the fuel pump being configured to pressurise the high-gasoline content fuel; and an engine controller configured to control the fuel pressure generated by the fuel pump, the engine controller using a heated-fuel behaviour model of the engine, when the fuel is being heated by the heating element(s), to cause a higher fuel pressure to be generated by the fuel pump relative to unheated high-gasoline content fuel.

The engine controller may use an unheated-fuel behaviour model of the engine when the fuel is not being heated by the heating element(s) and the heated-fuel behaviour model may cause the engine controller to cause a higher fuel pressure to be generated by the fuel pump relative to the unheated-fuel behaviour model of the engine.

The vehicle may comprise an engine temperature sensor, and wherein the engine controller may be configured to cause the high-gasoline content fuel to be heated by the at least one heating element whilst the engine temperature is below a predefined threshold temperature. The predefined threshold temperature may be a normal engine operating temperature. The predefined threshold temperature may be below a normal engine operating temperature. The internal combustion engine may be configured to generate the engine torque for driving the vehicle. The engine controller may be configured to cause the at least one heating element to heat the high-gasoline content fuel.

According to a third aspect of the present invention there is provided a vehicle comprising: an internal combustion engine configured to generate an engine torque using high-gasoline content fuel; at least one fuel injector configured to deliver the high-gasoline content fuel to a cylinder of the engine; at least one heating element configured to heat the high-gasoline content fuel prior to it being delivered to the cylinder by the fuel injector; and an engine controller configured to control the engine torque generated by the engine, the engine controller using a heated-fuel behaviour model of the engine, when the fuel is being heated by the heating element(s), to control an amount of fuel delivered by the fuel injector, the heated-fuel behaviour model causing a reduced fuel injection amount for a given engine torque relative to unheated high-gasoline content fuel.

The heated-fuel behaviour model may cause a reduction in the carbon-dioxide emissions of the internal combustion engine relative to unheated high-gasoline content fuel. The heated-fuel behaviour model may cause a reduction in the pollutant emissions of the internal combustion engine relative to unheated high-gasoline content fuel.

The engine controller may use an unheated-fuel behaviour model of the engine when the fuel is not being heated by the heating element(s) and the heated-fuel behaviour model causing a reduced fuel injection amount for a given engine torque relative to the unheated-fuel behaviour model of the engine. The internal combustion engine may comprise at least one intake port for the cylinder and an intake valve for controlling the flow of an air-mixture in to the cylinder, wherein the at least one fuel injector may be configured to inject the high-gasoline content fuel in a region near the intake valve exterior to the cylinder. The vehicle may comprise an engine temperature sensor, and wherein the engine controller may be configured to cause the high-gasoline content fuel to be heated by the at least one heating element whilst the engine temperature is below a predefined threshold temperature. The predefined threshold temperature may be a normal engine operating temperature. The predefined threshold temperature may be below a normal engine operating temperature.

The heated-fuel behaviour model may adjust the fuel injection amount for a given engine torque based on the vapour content value of the heated fuel. The internal combustion engine may be configured to generate the engine torque for driving the vehicle. The engine controller may be configured to cause the at least one heating element to heat the high-gasoline content fuel. The engine controller may be configured to control the engine torque generated by the engine in response to a target drive demand input.

BRIEF DESCRIPTION OF THE FIGURES

The present invention will now be described by way of example with reference to the accompanying drawings. In the drawings.

DETAILED DESCRIPTION OF VARIOUS EMBODIMENTS

Figure 1:
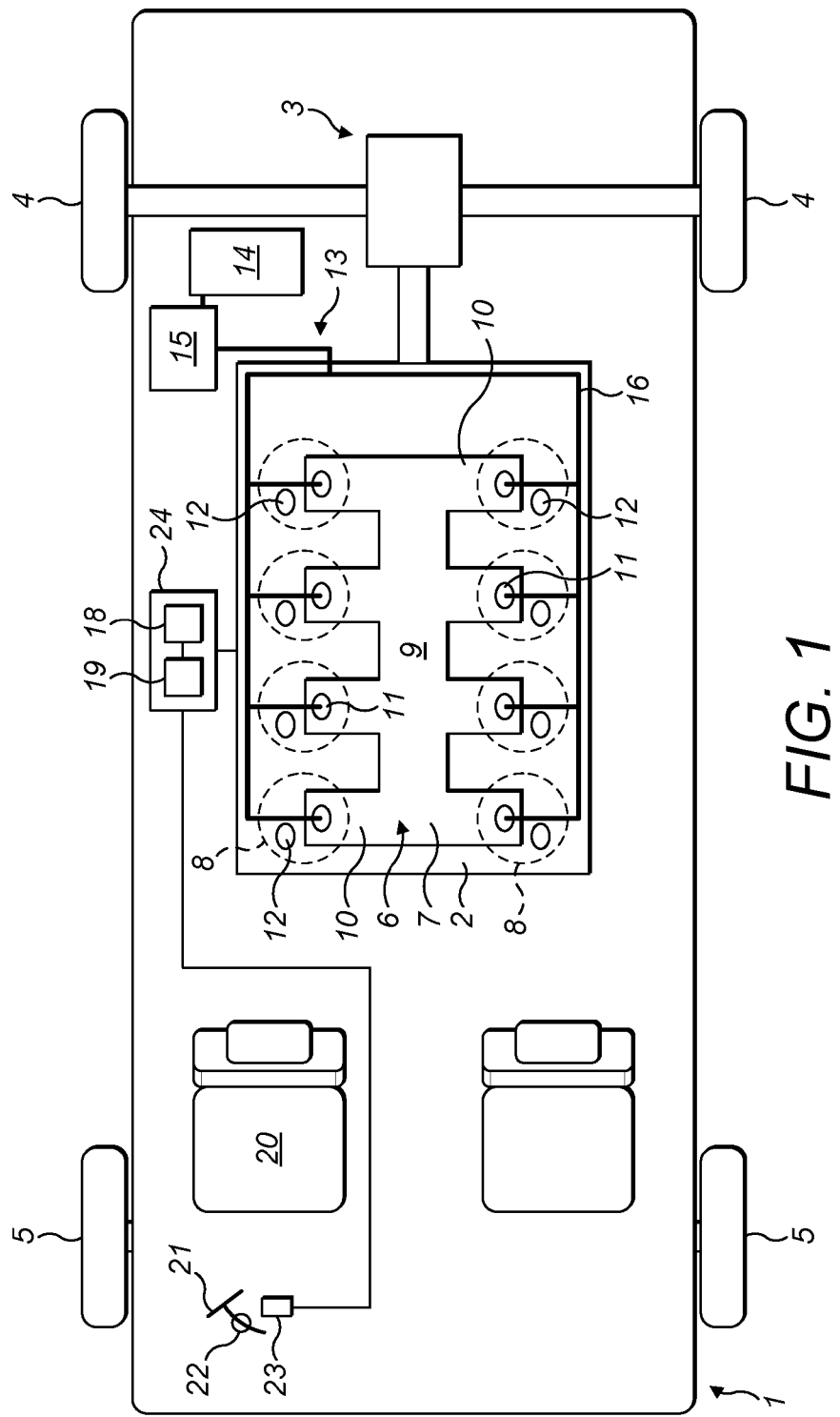
FIG. 1 shows a schematic drawing of a vehicle comprising an internal combustion engine that comprises a fuel heating system.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising an internal combustion engine configured to generate an engine torque using high-gasoline content fuel. This engine torque may be used for driving the vehicle either directly by the engine being coupled to wheels of the vehicle or indirectly by the engine providing energy that can then be used to drive the vehicle for instance by the engine being coupled to at least one generator and the generator(s) being configured to provide power to one or more electric motors which are configured to drive the wheels of the vehicle. The vehicle also comprises at least one fuel injector configured to deliver the high-gasoline content fuel into a cylinder of the engine. The vehicle comprises a heating element configured to heat the high-gasoline content fuel prior to it being delivered to the cylinder by the fuel injector. The vehicle comprises an engine controller that is configured to control the engine torque generated by the engine, and the engine controller uses a heated-fuel behaviour model of the engine to control the amount of fuel delivered by the fuel injector. The engine controller may be configured to control the engine torque generated by the engine in response to a powertrain drive demand input. The powertrain drive demand input may be a throttle input. The heated-fuel behaviour model can cause a reduced fuel injection amount for a given engine torque relative to unheated high-gasoline content fuel. The vehicle may comprise a fuel pump connected to the heating element to supply high-gasoline content fuel to the heating element, the fuel pump being configured to pressurise the high-gasoline content fuel. The engine controller may be configured to control the fuel pressure generated by the fuel pump. The heated-fuel behaviour model can cause a higher fuel pressure to be generated by the fuel pump relative to unheated high-gasoline content fuel.

An internal combustion engine to which the principles described herein apply is not limited in its configuration and could be a straight, flat or V-engine having any number of cylinders. The internal combustion engine may be part of a hybrid drive system for the vehicle where the vehicle comprises one or more electrical machines and an internal combustion engine that can separately and/or in combination drive the vehicle. For example, the internal combustion engine may be part of a parallel hybrid drive system whereby one or more electrical machines and the internal combustion engine each generate torques that can separately and/or in combination be delivered to the wheels of the vehicle for driving the vehicle. Alternatively, the internal combustion engine may be part of a series hybrid drive system whereby the internal combustion engine is coupled to one or more first electrical machines which generate power from the engine torque generated by the internal combustion engine. The power generated by the one or more first electrical machines may be transferred to one or more second electrical machines to generate motor torques for driving the vehicle.

FIG. 1 shows a vehicle 1. Vehicle 1 comprises an internal combustion engine 2. Internal combustion engine 2 may be coupled to drive system 3 for the transference of an engine torque, generated by the internal combustion engine 2, from the internal combustion engine 2 to drive wheels 4 of the vehicle 1. Alternatively, as discussed above, internal combustion engine 2 may be coupled to drive system 3 for the transference of an engine torque to one or more first electrical machines for the generation of drive power. The one or more first electrical machines may be coupled to one or more second electrical machines to receive the drive power and generate motor torques to drive wheels 4 of the vehicle 1. These electrical machines together with the internal combustion engine 2 may together form a powertrain of the vehicle 1.

The vehicle may comprise a plurality of wheels 4, 5 for supporting the vehicle 1 on a surface. Some of those wheels may be drive wheels 4 and some of those wheels may be non-drive wheels 5. It will be appreciated that any configuration of drive 4 and non-drive wheels 5 may be used depending on the particular drive characteristics required by the vehicle 1.

The drive system 3 may comprise at least one of gearbox (es), clutch(es), differential(s), and drive shafts.

The vehicle 2 may comprise an air intake system 6 for internal combustion engine 2. The intake system 6 may comprise an intake manifold 7 that is fed an air mixture by at least one intake port (not shown). The flow of air mixture, via the at least one intake port, in to the intake manifold 7 may be regulated by at least one throttle. The intake manifold permits the flow of the air mixture from the intake ports to the cylinders 8 of the engine 2. The cylinders 8 each house a piston which is caused to move by the ignition of fuel present in the respective cylinder. The pistons are each coupled to a drive axel of the engine 2 to enable generation of the engine torque by means of the movement of the pistons.

The intake manifold 7 comprises a plenum 9 configured to permit even air flow to each of the cylinders 8. The intake manifold comprises a plurality of runners 10 which permit the flow of the air mixture from the plenum 9 to the cylinders 8 of the internal combustion engine 2. Generally, the intake manifold 7 comprises a runner 10 per cylinder 8 of the engine, and each runner 10 permits the flow of the air mixture present in the intake manifold 7 to a different respective cylinder 8. In such a configuration, each runner 10 may, at one end, be connected to the plenum 9 of the intake manifold 7 and, at the other end, be configured to permit the flow of the air mixture into the cylinder 8 of the engine 2.

One or more intake valves 11 may restrict the flow of the air mixture, via intake port(s) also shown generally at 11, into the respective cylinder 8. One or more exhaust valves 12 may restrict the flow of exhaust gases, via exhaust port(s) also shown generally at 12, from a respective cylinder 8 to one or more exhausts of the vehicle.

In a more general case to the above, two or more of the runners 10 may have a common point of supply from the intake manifold 7, this supply may branch so that there results a separate runner 10, or distribution channel, for each cylinder 8.

The vehicle 2 may also comprise a fuel supply system 13. Fuel supply system 13 may comprise at least one fuel tank 14. The fuel supply system 13 is connected to at least one fuel tank 14 that is configured to store fuel for use by internal combustion engine 2 in producing the engine torque. The fuel supply system 13 may comprise one or fuel filters and fuel pumps shown generally at 15. The fuel filter(s) 15 are configured to remove any foreign objects, such as rust from the interior of the fuel tank, from the fuel. Fuel pump(s) 15 are configured to pressurise the fuel present in fuel supply system 13. The fuel pump(s) 15 may be configured to variably pressurise the fuel present in the fuel supply system 13. The fuel pump(s) 15 may be configured to receive an input that the fuel pump(s) 15 use to set the pressure of the fuel present in the fuel supply system 13 and specifically in a fuel rail 16.

Fuel supply system 13 may further comprise a fuel rail 16 connected to fuel tank 14, via the various fuel pump(s) 15 and fuel filter(s) 15 that may be present in the system.

Fuel rail 16 is configured to deliver fuel to each cylinder 8 of the engine 2. The fuel may be delivered to each cylinder 8 by one or more fuel injectors. These fuel injector(s) may inject fuel directly into the respective cylinder 8 of the engine 2. Alternatively, the fuel injector(s) may inject fuel into the region of the intake manifold 7 near the intake valve(s) of the engine 2. The fuel injector(s) may inject fuel on to intake valve(s) of the engine 2. This region may be part of the respective runner 10 of the intake manifold 7 for the particular cylinder 8.

The configuration of an example fuel rail 16 will be discussed in further detail with respect to FIG. 2 below.

Within the body is a seat 20 for a driver. When a driver is sat in the seat 20 he can reach a throttle pedal 21 with his foot. The throttle pedal is pivotable about its rearmost end relative to the body of the vehicle. Its forward end is biased upwardly by spring 22 to an uppermost position where it hits a stop, and can be pressed down by the driver's foot to a lowermost position where it hits another stop. The pedal is thus constrained to be movable only between the uppermost position ("0%") and the lowermost position ("100%"). A position detector 23 is attached to the pedal and senses the angle of deflection of the pedal. It will be appreciated that other throttle controls could be used instead of the throttle pedal 21 to gather the target drive demand from the powertrain of the vehicle requested by the driver. As discussed above, the internal combustion engine may form part of the powertrain or may be the powertrain of the vehicle. For instance, the vehicle could comprise a hand operated control as a throttle control. The vehicle may also calculate the target drive demand autonomously, for example, by means of an adaptive cruise control system.

The operation of the engine 2 is regulated by an ECU 24. The ECU 24 comprises a processor 18 and a non-volatile memory 19. The ECU 24 may comprise more than one processor 18 and more than one memory 19. The memory 19 stores a set of program instructions that are executable by the processor, and reference data such as look-up tables that can be referenced by the processor in response to those instructions. The processor 18 may be configured to operate in accordance with a computer program stored in non-transitory form on a machine readable storage medium. The computer program may store instructions for causing the processor to perform the operations of the ECU in the manner described herein.

The ECU is coupled to the position detector 23 to receive from it the detected position of the throttle pedal. The ECU is coupled to the engine to receive from it data relating to the operation of the engine, such as current RPM, engine temperature and inlet air temperature, and to transmit to the engine control information that will regulate the operation of the engine. That control information could, for example, include the amount of fuel and/or air to be charged in each inlet stroke, valve and ignition timings and turbo boost level.

The program instructions stored by the memory define a mechanism whereby the ECU can determine a set of output parameters for controlling the engine in response to a set of input parameters it has received and/or computed. In the present example, the ECU may follow a two-stage process to determine the output parameters. First, in response to at least some of the input parameters (including, for example, throttle position and a representation of throttle direction) the ECU determines a target drive demand from the engine. This target drive demand may be the drive required from the engine to drive the vehicle directly, or the drive required to power one or more electrical machines to generate power that is then used to drive the vehicle. The drive demand can conveniently be a torque demand, but it could be expressed in other ways such as power demand or fuel burned per unit time. Second, using a pre-stored model of the behaviour of the engine the ECU determines the outputs needed to cause the engine to satisfy that drive demand. It then transmits those outputs to the engine to cause the engine to behave in accordance with the computed drive demand. These stages are repeated frequently: typically 20 or more times per second, to generate a series of output values reflecting up-to-date input values.

The engine 2 described above is configured to accept the supply of a fuel that comprises gasoline. Thus, the fuel tank 14, fuel pump(s) 15, fuel filter(s) 15, fuel supply system 13, fuel rail 16 and fuel injectors are all configured to be capable of the supply of gasoline comprising fuel. In particular, the engine 2 and associated fuel supply components described above, are configured to accept the supply of a high-gasoline content fuel. Gasoline containing fuel may comprise other additives such as fuel stabilizers, antiknock additives, and detergents. Therefore, high-gasoline content fuel is likely to be composed of less than 100% gasoline. Gasoline containing fuel may also comprise ethanol. Ethanol is blended with gasoline, in part, because ethanol can be produced from renewable sources and can also be cheaper to supply in parts of the world, for example, where there are limited supplies of gasoline. In the case, that ethanol is blended into the gasoline containing fuel, high-gasoline content fuel means fuel that comprises (i) mostly gasoline, and (ii) not more than 25% by volume of ethanol, preferably not more than 20% by volume of ethanol, preferably not more than 15% by volume of ethanol, more preferably not more than 10% by volume of ethanol, and even more preferably not more than 5% volume of ethanol. It will be understood that of the percentage by volume of high-gasoline fuel that is not ethanol almost all of the remainder is gasoline, apart from the other additives that are added to engine fuel as described above. In other words, high-gasoline content fuel means fuel that comprises at least 75% by volume of gasoline, at least 80% by volume of gasoline, preferably at least 85% by volume of gasoline, more preferably at least 90% by volume of gasoline, and even more preferably at least 95% by volume of gasoline.

The engine 2 is configured to generate an engine torque using gasoline containing fuel and, preferably, high-gasoline content fuel. The ECU 24 may also be specifically configured to control an engine 2 that uses gasoline containing fuel, and preferably high-gasoline content fuel for the generation of an engine torque. The gasoline engine 2 and/or ECU 24 may be so configured by means of one or more of:

The size of the engine's pistons.
  The shape of the piston head.
  The type of spark plug used to ignite fuel present in the cylinder 8 during the compression and ignition stroke of the engine for the respective cylinder 8.
  The pre-stored model of the behaviour of the engine 2 that the ECU uses to determine the outputs needed to cause the engine to satisfy that drive demand.
  The type of fuel pump(s) 15 and fuel filter(s) 15 that are part of the fuel supply system 13.

The size and/or shape of the intake and/or exhaust port(s) for each cylinder.

The size and/or shape of the intake and/or exhaust valves for each cylinder.

Figure 2:
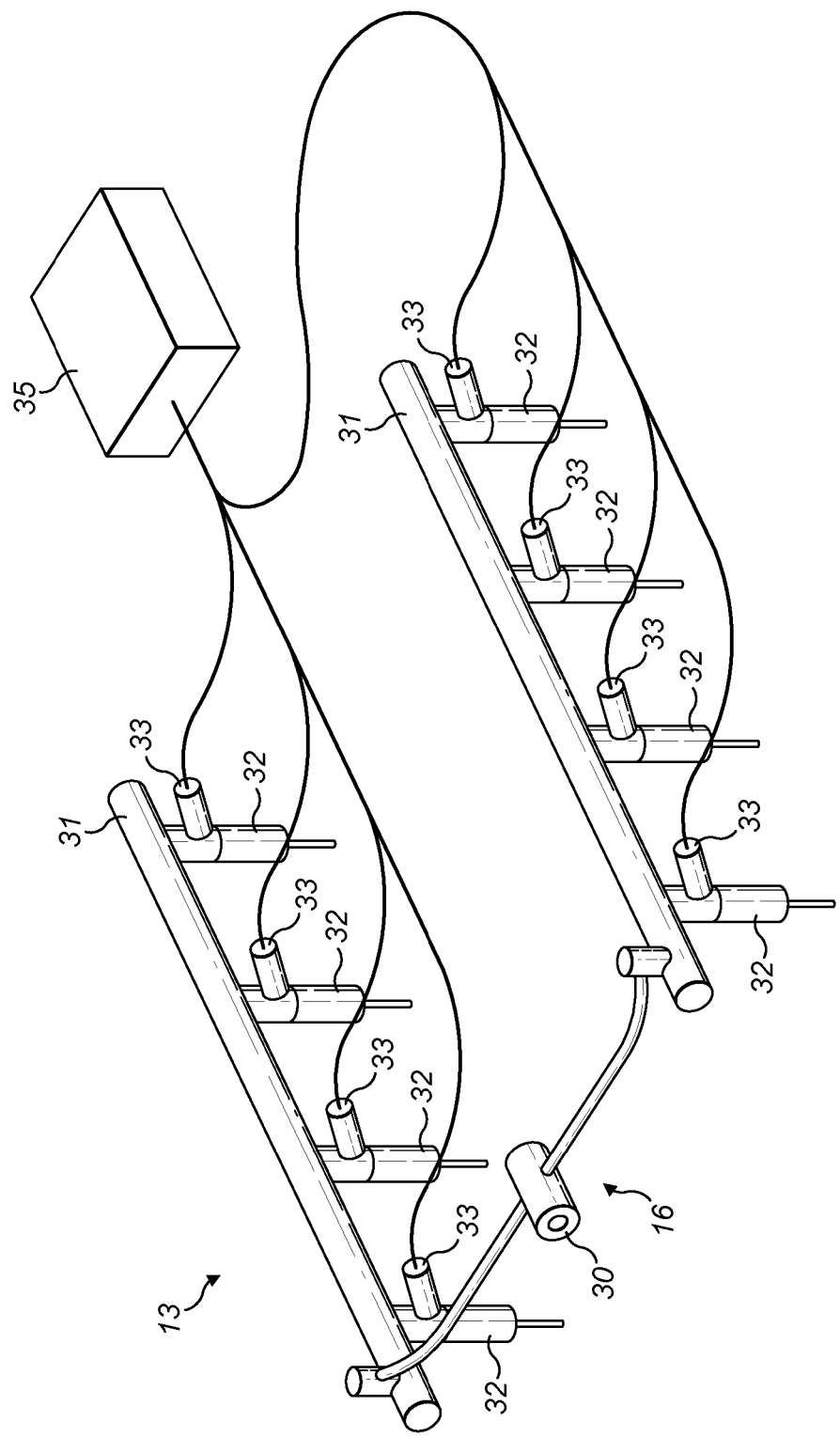
FIG. 2 shows a schematic drawing of elements of a fuel supply system for an internal combustion engine.

FIG. 2 shows a schematic drawing of elements of a fuel supply system 13 for an internal combustion engine 2. As discussed above, the fuel supply system 13 may comprise a fuel rail 16 connected to fuel tank 14, via the various fuel pump(s) 15 and fuel filter(s) 15 that may be present in the system. Fuel rail 16 is configured to deliver fuel to each cylinder 8 of the engine 2. The fuel rail 16 may be receive fuel from the fuel tank 14, via the various fuel pump(s) and fuel filter(s), by means of a fuel intake port 30. Fuel rail 16 therefore may comprise a fuel intake port 30 configured to receive fuel from the fuel tank 14. The fuel received by fuel intake port 30 is pressurised by the at least one fuel pump 15.

Fuel rail 16 comprises at least one fuel distribution channel 31 configured to permit fuel to flow from fuel intake port 30 to the fuel injectors 32. The fuel being delivered to each cylinder 8 by one or more of the fuel injectors 32. The number of fuel injectors 32 is dependent on the specific configuration of the engine 2:

As discussed above, these fuel injector(s) 32 may inject fuel directly into the respective cylinder 8 of the engine 2. In this case, there is commonly one injector per cylinder 8, but more injectors may be present in particular engine configurations. Such a configuration of injectors may be called gasoline direct injection.

Alternatively, the fuel injector(s) may inject fuel into the region of the intake manifold 7 near the intake valve(s) of the engine 2. This region may be part of the respective runner 10 of the intake manifold 7 for the particular cylinder 8. At least one injector may inject fuel in proximity to the intake valve head. There may be one injector per intake valve. Such a configuration of injectors may be called port fuel injection.

Based on the above, it will therefore be appreciated that although FIG. 2 shows one injector per cylinder 8 of the engine 2 shown in FIG. 1, that other configurations of injectors may be used.

It has been determined that the fuel efficiency of an engine that is configured to generate an engine torque using gasoline containing fuel, and particularly high-gasoline content fuel can be improved if the gasoline fuel is heated prior to it being delivered by fuel injectors into cylinders 8 of the engine 2. The improvement in fuel efficiency thus leads to lower carbon dioxide emissions in the exhaust gasses produced by the engine 2 for a given power output and, it has been determined, also leads to a lowering in pollutant emissions in the exhaust gasses produced by the engine 2 due to a more efficient burning of the gasoline fuel in the cylinders 8 of the engine 2.

Based on the above, the fuel supply system 13 may also comprise one or more fuel heating elements 33 configured to heat the fuel prior to it being injected by injectors 32. As pictured, heating element(s) 33 may be connected to fuel rail 31 to heat fuel contained within fuel rail 31 before it is supplied to injectors 32. Heating element 33 may be connected to injector 32 to heat fuel as it is transferred to injector 32, or heat fuel inside injector 32. Usually there is little room around injector 32 due to the tight packaging requirements near the cylinder head of the engine, and so heating element 33 may be disposed, as pictured, on the fuel supply line to injector 32 where there is more space.

As shown in FIG. 2, there may be one heating element 33 per cylinder. As FIG. 2 shows only one injector per cylinder, this also corresponds to one heating element 33 per cylinder. However, in alternative configurations where there is more than one injector 32 per cylinder this may mean multiple injectors 32 sharing one heating element 33.

The heating elements 33 may be connected to a fuel heating controller 35. The fuel heating controller 35 may be configured to provide inputs and/or power to heating elements 33 to control the temperature to which the heating elements 33 heat the fuel contained in fuel supply system 16. The fuel heating controller 35 may be configured in a similar way to the ECU 24, in that it comprises a processor and memory configured as described with reference to the ECU above. The fuel heating controller 35 may be part of the ECU 24, and/or may together be part of an vehicle management system.

The heating element(s) 33 therefore raise the temperature of the gasoline containing fuel prior to it being injected by injectors 32. This is advantageous because fuel inside the cylinder is burned in the presence of air when the fuel is in vapour form. Injecting the fuel in to the engine, either directly or via the intake port(s), lowers the temperature of the fuel due to the fuel expanding as it leaves the injector under pressure. Additionally, in situations where the engine is cold, for instance when it is first started up, the engine itself absorbs heat from the fuel thus lowering its temperature. The amount of fuel that is in vapour form is dependent on the temperature of the fuel. The lower the temperature of the fuel the lower the amount of fuel that is in vapour form. Therefore, at lower fuel temperatures, more fuel is required to produce the required amount of fuel vapour to react with the oxygen in the air in the cylinder during the compression stroke of the engine to burn and create the required torque demand at any given time. This is normally referred to a running the engine on a rich mixture (rich air-to-fuel mixture). The excess fuel present may be burned after the power part of the engine's cycle or even as it is being expelled from the cylinder on the exhaust stroke. This leads to emissions of carbon dioxide that were not used for the creation of engine torque within the engine thus raising the level of carbon dioxide emissions from the engine needlessly. Additionally, this fuel will be burned in sub-optimal conditions and is more likely to produce pollutants, such as soot, nitrogen-oxides (NOxs), carbon monoxide (CO), total hydrocarbons (THC) and non-methane hydrocarbons (NMHC).

It has been identified that although gasoline burning in modern engines is already very efficient, a gain in the reduction of CO2 and pollutant emissions can be obtained by heating the gasoline containing fuel. As discussed above, the ECU 17 can determine a set of output parameters for controlling the engine 2 in response to a set of input parameters it has received and/or computed. The ECU 17 may use a pre-stored model of the behaviour of the engine 2 to determine the outputs needed to cause the engine to satisfy a given drive demand. Where the fuel is heated by fuel heating element(s) 33 prior to injection, the ECU may use a pre-stored model of the behaviour of the engine 2 which takes in to account the higher temperature of the fuel being injected. The ECU may use a pre-stored heated-fuel model when the fuel is being heated by the heating element(s) and may use a pre-stored unheated-fuel model when the fuel is not being heated by the heating element(s). The pre-stored heated-fuel model and the pre-stored unheated-fuel model may be parts of an overall model of behaviour of the engine 2. The pre-stored model may be an output map which, for a given torque demand, tells the ECU the outputs required to cause the engine to generate a desired engine torque. Such a heated-fuel model of engine behaviour may comprise, relative to a non-heated-fuel model of engine behaviour:

Lower fuel injection amounts for a given drive demand.

Different fuel pressure. The pressure of the fuel that is generated by fuel pump 15. A higher fuel pressure may be generated by the fuel pump 15 within the fuel rail 16 when the fuel is being heated than when the fuel is not being heated. Thus, the heated-fuel model may cause the fuel pump to generate a higher fuel pressure within the fuel rail than is caused to be generated by the non-heated-fuel model. The increase in fuel pressure means that the fuel has an increased boiling point. This reduces the chance of formation of bubbles within the fuel and/or reduces the number of bubbles that are formed within the fuel. The fuel can also be heated to a higher temperature (relative to fuel that has not been pressurised to such a level) thus improving the chances of vaporisation of the fuel during fuel injection.

Different ignition timings. The relative timing of ignition caused by a spark plug for a given cylinder relative to the position of the respective piston during its compression and combustion strokes. The heated-fuel model of engine behaviour may comprise ignition timings that are retarded relative to those comprised within the non-heated-fuel model of engine behaviour. In the case that the fuel has been heated, the fuel may take less time to fully ignite within the cylinder and so the ignition may occur closer to the top dead centre position of the piston stroke whilst still giving the desired power from that ignition cycle.

Different amounts of torque reserve derived from changing the ignition timing from an optimal ignition timing for a given fuel supply amount thus altering the torque generated by the engine for a given fuel supply amount relative to the optimal ignition timing. The heated-fuel model of the engine may permit a higher amount of torque reserve relative to the non-heated-fuel model of the engine. This is because the optimum ignition point when the fuel is being heated may be closer to top dead centre position of the piston stroke meaning there is slightly more timing width which the ignition timing can be advanced from the optimum ignition point.

Different amounts of secondary air injection into the exhaust to create combustion of hydrocarbons present in the exhaust gases. The heated-fuel model of the engine may cause less secondary air injection into the exhaust compared with the non-heated-fuel model of the engine. Thus, less air is injected into the exhaust to burn hydrocarbons in the exhaust during the period that the fuel is heated than when the fuel is unheated. The secondary air is used to enhance post-combustion in gases present in the exhaust during catalyst heating occurring due to cold engine start up and warm up. The injection of secondary air into the exhaust reduces the amount of CO and THC present in the exhaust gases but increases the amount of NOx. In the case of the fuel being heated, less secondary air injection is required because the amount of CO and THC in the exhaust is reduced which thus lowers the amount of NOx created by post-combustion in the exhaust. Secondary air may be injected into the exhaust by one or more air pumps. Secondary air may be injected into the exhaust by one or more flaps in the exhaust that permit air to flow into the exhaust.

Different injection arc timing. The injection phase timing at which the fuel starts to be injected in to a given cylinder for a given cycle of the engine. The fuel injection start point for a given cylinder for a given cycle of the engine may be closer to the inlet valve opening point for the heated-fuel model of the engine relative to the non-heated-fuel model of the engine. The fuel injection start point for a given a given cylinder for a given cycle of the engine may be at the inlet valve opening point for the heated-fuel model of the engine. In a port fuel injection system, the fuel is usually injected on to the closed inlet valve to cause vaporisation of the fuel (as the inlet valve(s) are hot). When the fuel is being heated, less contact time, or potentially no contact time, between the fuel and the inlet valve is required to vaporise the fuel, thus the injection point may be retarded relative to the unheated fuel situation.

Different inlet valve opening times. The inlet valve opening times may be shorter for the heated-fuel model of the engine relative to the non-heated-fuel model of the engine. This can be because the fuel is more likely to be vaporised and so easier to permit to flow into the engine. The inlet valve opening times may be longer for the heated-fuel model of the engine relative to the non-heated-fuel model of the engine. This can be because the fuel is vaporised and so more air can be permitted to flow into a given cylinder.

Different exhaust valve opening times. The exhaust valve opening times may be shorter for the heated-fuel model of the engine relative to the non-heated-fuel model of the engine. The can be because the fuel burned more completely due to the heating of the fuel. The exhaust valve opening times may be longer for the heated-fuel model of the engine relative to the non-heated-fuel model of the engine. This can be because of the different mix of exhaust gases due to the heating of the fuel.

Different number of injections for a given cylinder for a given cycle of the engine. This may be implemented where the injection is into a given cylinder of the engine.

Different lengths of spark duration. The length of time that an arc is generated by a given spark plug.

Different injection arc duration. The length of time that fuel is injected in to a given engine cylinder.

As discussed above, the ECU 24 may have as one of its inputs the current temperature of the engine. This may be the current temperature of the region of the engine near the cylinders, i.e. the engine block. The ECU 24 may be configured to cause the fuel to be heated until the engine reaches normal operating temperature. This temperature may be a predefined operating temperature. The ECU 24 may be configured to cause the fuel to be heated until the engine reaches a predefined threshold temperature. This predefined threshold temperature may be the normal operating temperature. Alternatively, the predefined threshold temperature may be a lower temperature than the normal operating temperature but a temperature at which the fuel is burned with the required level of efficiency in the engine. Therefore, the threshold temperature may be the engine temperature at which the carbon-dioxide emissions generated by the engine without fuel-heating are close to or the same as those generated by the engine with fuel-heating. The ECU 24 may be configured to cause the fuel to be heated until the exhaust gas mass flow from the engine reaches a threshold level. The ECU 24 may be configured to case the fuel to be heated until a catalytic converter coupled to the exhaust of the engine reaches a threshold temperature level. The ECU may cause the fuel to be heated by sending an instruction to the fuel heating controller 35 to cause the heating elements 33 to heat the fuel.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
   an internal combustion engine comprising at least one cylinder, the internal combustion engine being configured to generate an engine torque using high-gasoline content fuel and to generate a spark inside the cylinder to ignite the high-gasoline content fuel;
   at least one fuel injector configured to deliver the high-gasoline content fuel to a cylinder of the engine;
   at least one heating element configured to heat the high-gasoline content fuel prior to it being delivered to the cylinder by the fuel injector;
   a fuel pump connected to the heating element to supply high-gasoline content fuel to the heating element, the fuel pump being configured to pressurise the high-gasoline content fuel; and
   an engine controller configured to control the engine torque generated by the engine and control the fuel pressure generated by the fuel pump,
   wherein:
      the engine controller uses a heated-fuel behaviour model of the engine, when the fuel is being heated by the heating element(s), to: (i) control an amount of fuel delivered by the fuel injector, the heated-fuel behaviour model causing a reduced fuel injection amount for a given engine torque relative to unheated high-gasoline content fuel; and (ii) cause a higher fuel pressure to be generated by the fuel pump relative to unheated high-gasoline content fuel;
      the engine controller is configured to control the generation of the spark, the engine controller using a heated-fuel behaviour model of the engine, when the fuel is being heated by the heating element(s), to control the generation of the spark inside the cylinder so that the spark occurs later in an engine cycle for the cylinder relative to unheated high-gasoline content fuel; and
      the engine controller uses an unheated-fuel behaviour model of the engine when the fuel is not being heated by the heating element(s) and the heated-fuel behaviour model causes the engine controller to cause the spark generation to occur later in an engine cycle for the cylinder relative to the unheated-fuel behaviour model of the engine.

2. A vehicle according to claim 1, wherein the heated-fuel behaviour model causes a reduction in the carbon-dioxide emissions of the internal combustion engine relative to unheated high-gasoline content fuel.

3. A vehicle according to claim 1, wherein the heated-fuel behaviour model causes a reduction in the pollutant emissions of the internal combustion engine relative to unheated high-gasoline content fuel.

4. A vehicle according to claim 1, wherein the engine controller uses an unheated-fuel behaviour model of the engine when the fuel is not being heated by the heating element(s) and the heated-fuel behaviour model causes a reduced fuel injection amount for a given engine torque relative to the unheated-fuel behaviour model of the engine.

5. A vehicle according to claim 1, wherein:
   the internal combustion engine comprises at least one intake port for the cylinder and an intake valve for controlling the flow of an air-mixture in to the cylinder, and
   the at least one fuel injector is configured to inject the high-gasoline content fuel in a region near the intake valve exterior to the cylinder.

6. A vehicle according to claim 1, wherein:
   the vehicle further comprises an engine temperature sensor, and
   the engine controller is configured to cause the high-gasoline content fuel to be heated by the at least one heating element whilst the engine temperature is below a predefined threshold temperature.

7. A vehicle according to claim 6, wherein the predefined threshold temperature is a normal engine operating temperature.

8. A vehicle according to claim 6, wherein the predefined threshold temperature is below a normal engine operating temperature.

9. A vehicle according to claim 1, wherein the heated-fuel behaviour model adjusts the fuel injection amount for a given engine torque based on the vapour content value of the heated fuel.

10. A vehicle according to claim 1, wherein the engine controller is configured to control the engine torque generated by the engine in response to a target drive demand input.

11. A vehicle according to claim 1, wherein the engine controller uses an unheated-fuel behaviour model of the engine when the fuel is not being heated by the heating element(s) and the heated-fuel behaviour model causes the engine controller to cause a higher fuel pressure to be generated by the fuel pump relative to the unheated-fuel behaviour model of the engine.

12. A vehicle according to claim 1, wherein:
   the vehicle further comprises an exhaust connected to the internal combustion engine to receive exhaust gases from the engine; and a secondary air injection device for injecting air into the exhaust, and
   the engine controller is configured to control the amount of air injected by the secondary air injection device into the exhaust, the engine controller using a heated-fuel behaviour model of the engine, when the fuel is being heated by the heating element(s), to cause a lower amount of air injection by the secondary air injection device relative to unheated high-gasoline content fuel.

13. A vehicle according to claim 12, wherein the engine controller uses an unheated-fuel behaviour model of the engine when the fuel is not being heated by the heating element(s) and the heated-fuel behaviour model causes the engine controller to cause the lower amount of air injection by the secondary air injection device relative to the unheated-fuel behaviour model of the engine.

14. A vehicle according to claim 1, wherein:
the internal combustion engine further comprises at least one inlet port for a respective cylinder of the engine, and an inlet valve associated with each inlet port, the inlet valve being moveable between a first position where the valve seals the inlet port and a second position where the valve permits fluid flow through the inlet port to the respective cylinder, and
the fuel injector(s) deliver fuel to a region near respective inlet valve(s), and the engine controller is configured to control when the fuel injector injects fuel, the engine controller using the heated-fuel behaviour model of the engine, when the fuel is being heated by the heating element(s), to cause the fuel injection for an engine cycle to start closer to when the inlet valve moves from the first position to the second position relative to unheated high-gasoline content fuel.

15. A vehicle according to claim 14, wherein the engine controller uses an unheated-fuel behaviour model of the engine when the fuel is not being heated by the heating element(s) and the heated-fuel behaviour model causes the engine controller to cause the fuel injection for an engine cycle to start closer to when the inlet valve moves from the first position to the second position relative to the unheated-fuel behaviour model of the engine.

16. A vehicle comprising:
an internal combustion engine configured to generate an engine torque using high-gasoline content fuel;
at least one fuel injector configured to deliver the high-gasoline content fuel to a cylinder of the engine;
at least one heating element configured to heat the high-gasoline content fuel prior to it being delivered to the cylinder by the fuel injector;
a fuel pump connected to the heating element to supply high-gasoline content fuel to the heating element, the fuel pump being configured to pressurise the high-gasoline content fuel;
an exhaust connected to the internal combustion engine to receive exhaust gases from the engine;
a secondary air injection device for injecting air into the exhaust; and
an engine controller configured to control the engine torque generated by the engine and control the fuel pressure generated by the fuel pump,
wherein:
the engine controller uses a heated-fuel behaviour model of the engine, when the fuel is being heated by the heating element(s), to: (i) control an amount of fuel delivered by the fuel injector, the heated-fuel behaviour model causing a reduced fuel injection amount for a given engine torque relative to unheated high-gasoline content fuel; and (ii) cause a higher fuel pressure to be generated by the fuel pump relative to unheated high-gasoline content fuel; and
the engine controller is configured to control the amount of air injected by the secondary air injection device into the exhaust, the engine controller using a heated-fuel behaviour model of the engine, when the fuel is being heated by the heating element(s), to cause a lower amount of air injection by the secondary air injection device relative to unheated high-gasoline content fuel.

17. A vehicle according to claim 16, wherein the engine controller uses an unheated-fuel behaviour model of the engine when the fuel is not being heated by the heating element(s) and the heated-fuel behaviour model causes the engine controller to cause the lower amount of air injection by the secondary air injection device relative to the unheated-fuel behaviour model of the engine.

18. A vehicle according to claim 16, wherein:
the vehicle further comprises an engine temperature sensor, and
the engine controller is configured to cause the high-gasoline content fuel to be heated by the at least one heating element whilst the engine temperature is below a predefined threshold temperature.

19. A vehicle comprising:
an internal combustion engine comprising at least one inlet port for a respective cylinder of the engine, and an inlet valve associated with each inlet port, the inlet valve being moveable between a first position where the valve seals the inlet port and a second position where the valve permits fluid flow through the inlet port to the respective cylinder, the internal combustion engine being configured to generate an engine torque using high-gasoline content fuel;
at least one fuel injector configured to deliver the high-gasoline content fuel to a respective cylinder of the engine;
at least one heating element configured to heat the high-gasoline content fuel prior to it being delivered to the cylinder by the fuel injector;
a fuel pump connected to the heating element to supply high-gasoline content fuel to the heating element, the fuel pump being configured to pressurise the high-gasoline content fuel; and
an engine controller configured to control the engine torque generated by the engine and control the fuel pressure generated by the fuel pump,
wherein:
the engine controller uses a heated-fuel behaviour model of the engine, when the fuel is being heated by the heating element(s), to: (i) control an amount of fuel delivered by the fuel injector, the heated-fuel behaviour model causing a reduced fuel injection amount for a given engine torque relative to unheated high-gasoline content fuel; and (ii) cause a higher fuel pressure to be generated by the fuel pump relative to unheated high-gasoline content fuel; and
the fuel injector(s) deliver fuel to a region near respective inlet valve(s), and the engine controller is configured to control when the fuel injector injects fuel, the engine controller using the heated-fuel behaviour model of the engine, when the fuel is being heated by the heating element(s), to cause the fuel injection for an engine cycle to start closer to when the inlet valve moves from the first position to the second position relative to unheated high-gasoline content fuel.

20. A vehicle according to claim 19, wherein the engine controller uses an unheated-fuel behaviour model of the engine when the fuel is not being heated by the heating element(s) and the heated-fuel behaviour model causes the engine controller to cause the fuel injection for an engine cycle to start closer to when the inlet valve moves from the first position to the second position relative to the unheated-fuel behaviour model of the engine.

21. A vehicle according to claim 19, wherein:
the vehicle further comprises an engine temperature sensor, and
the engine controller is configured to cause the high-gasoline content fuel to be heated by the at least one heating element whilst the engine temperature is below a predefined threshold temperature.

22. A vehicle according to claim 19, wherein the engine controller is configured to control the engine torque generated by the engine in response to a target drive demand input.

\* \* \* \* \*